Dec. 2, 1958  L. C. DOWNES  2,863,053
HEIGHT GATE GENERATORS OR THE LIKE
Filed Oct. 26, 1954  2 Sheets-Sheet 1

LLOYD C. DOWNES
*INVENTOR.*

BY

HIS ATTORNEY

LLOYD C. DOWNES
*INVENTOR.*

United States Patent Office 2,863,053
Patented Dec. 2, 1958

2,863,053

HEIGHT GATE GENERATORS OR THE LIKE

Lloyd C. Downes, Los Angeles, Calif., assignor to Hoffman Electronics Corporation, a corporation of California Application October 26, 1954, Serial No. 464,770

2 Claims. (Cl. 250—27)

This invention is related to radar systems and, more particularly, to circuit means for gating a radar display at a particular, discrete, angular increment of the vertical antenna scan.

In present radar systems, horizontally-rotating vertically-scanning antennas of either the physically "bobbing" variety or the electrically scanning variety drive two CRT displays to show range, azimuth, and elevation angle. Often it becomes desirable to select for observation a chosen increment of arc in the vertical antenna scan.

Therefore, it is an object of the present invention to provide a novel height gate generator circuit for employment in radar systems.

It is a further object of this invention to provide a new and useful gating circuit which will permit a CRT display of a chosen increment of the vertical scanning arc of a radar system providing range, azimuth and elevation information.

According to the present invention, a pulse generator drives a lightly synchronized blocking oscillator which serves as a divider circuit. The number of counts of this divider circuit is determined by a chosen number of discrete arc sectors of the antenna scan. The output pulses of the blocking oscillator trigger a first time base generating circuit, such as a phantastron, which produces a square wave output the trailing edge of which is discretely variable by suitable switching means in the phantastron circuit. This switching means is chosen to have a discrete number of settings equal to the number of counts of the blocking oscillator divider. The square wave phantastron output signal is fed through an R-C differentiator having a short time constant, and the negative pulses derived therefrom trigger a cathode-coupled gate circuit which supplies a pedestal to serve as a selector of a gating pulse. This pedestal overcomes the beyond cut-off bias on the latter portion of the cathode-coupled gate circuit and allows the selected pulse to be transmitted to a second phantastron. This second phantastron produces a square wave output signal of desired pulse width to turn on the electron beam in the CRT display tube during the selected time interval of the antenna scan.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
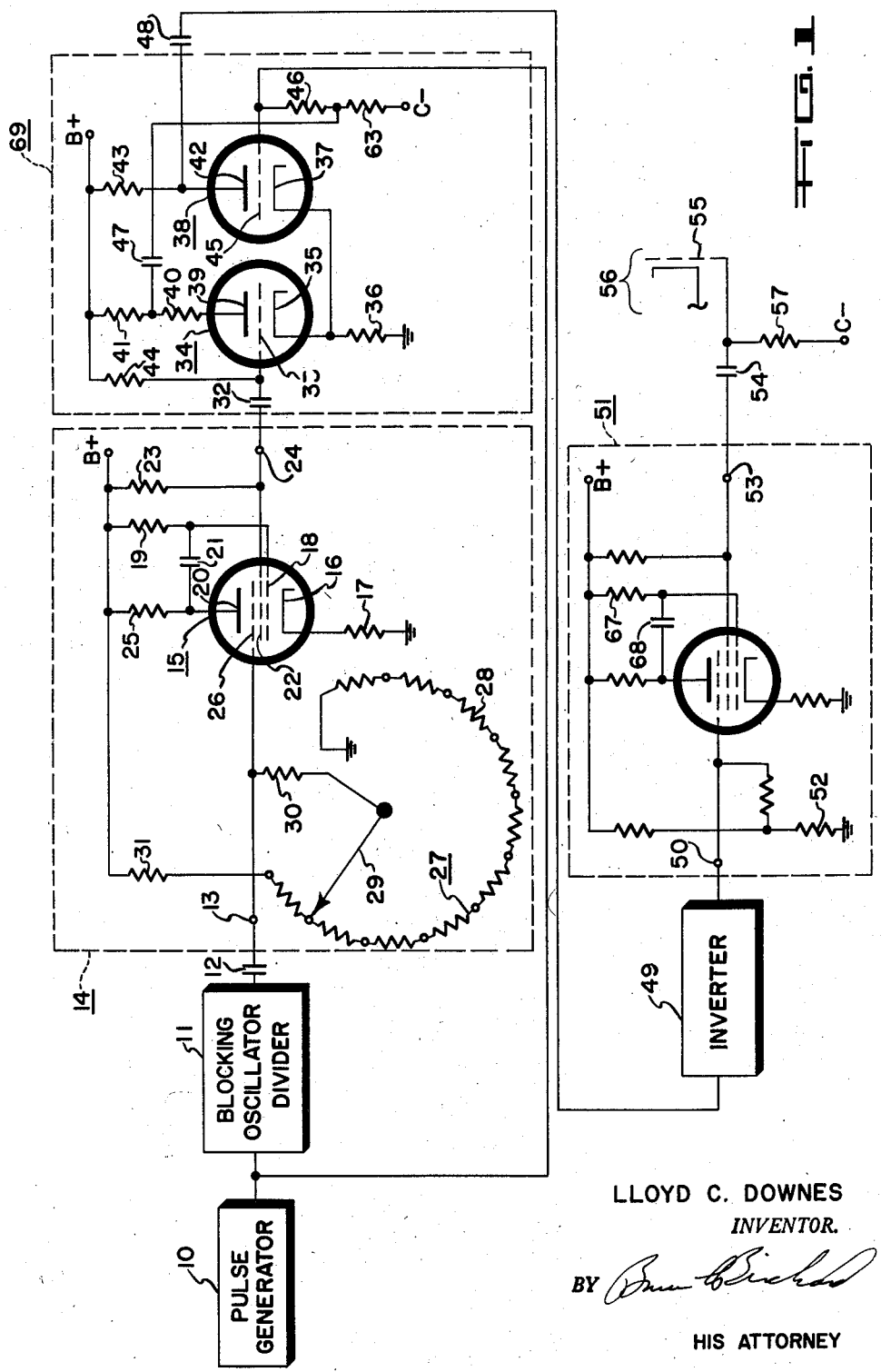
Figure 1 is a schematic diagram, partially in block form, of a height gate generator, according to the present invention.

In Figure 1, pulse generator 10 is coupled through blocking oscillator 11 and through coupling capacitor 12 to input terminal 13 of phantastron 14. Phantastron 14 is of a conventional design and employs vacuum tube 15 with cathode 16 coupled through resistor 17 to ground, control electrode 18 coupled through resistor 19 to a source of positive voltage (B+) and also coupled to anode 20 through capacitor 21, screen electrode 22 coupled through resistor 23 to a source of positive voltage (B+) and also to output terminal 24, anode 20 coupled through anode load resistor 25 to a source of positive voltage (B+), and suppressor electrode 26 coupled to input terminal 13. Potentiometer 27 consists of tapped resistance ring 28 and switching arm 29. Suppressor grid 26 of vacuum tube 15 is coupled through resistor 30 to switching arm 29. Resistance ring 28 is coupled between ground and source of positive voltage (B+) through resistor 31. Output terminal 24 of phantastron 14 is coupled through capacitor 32 to control electrode 33 of vacuum tube 34, in cathode-coupled gate circuit 69. Cathode 35 of vacuum tube 34 is coupled to ground through resistor 36. Cathode 37 of vacuum tube 38 is also coupled to ground through resistor 36. Anode 39 of vacuum tube 34 is coupled through resistors 40 and 41 to a source of positive voltage (B+). Anode 42 of vacuum tube 38 and control electrode 33 of vacuum tube 34 are coupled to a source of positive voltage (B+) through resistors 43 and 44, respectively. Control electrode 45 is coupled to a source of negative voltage (C—) through resistors 46 and 63, to pulse generator 10, and through resistor 46 and capacitor 47 to the junction of resistors 40 and 41. The output signal from cathode-coupled gate circuit 69 is coupled from anode 42 of vacuum tube 38 through coupling capacitor 48 and inverter 49 to input terminal 50 of phantastron 51. Phantastron 51 is shown to be similar to phantastron 14 with the exception that potentiometer 27 is replaced by resistor 52. With exception to this modification, no further description of the design of phantastron 51 is necessary. The output signal from phantastron 51 is coupled from output terminal 53 through capacitor 54 to control electrode 55 of cathode ray tube 56 (shown only in part). A source of negative bias voltage (C—) is also coupled to control electrode 55 of cathode ray tube 56 through resistor 57.

Figure 2:
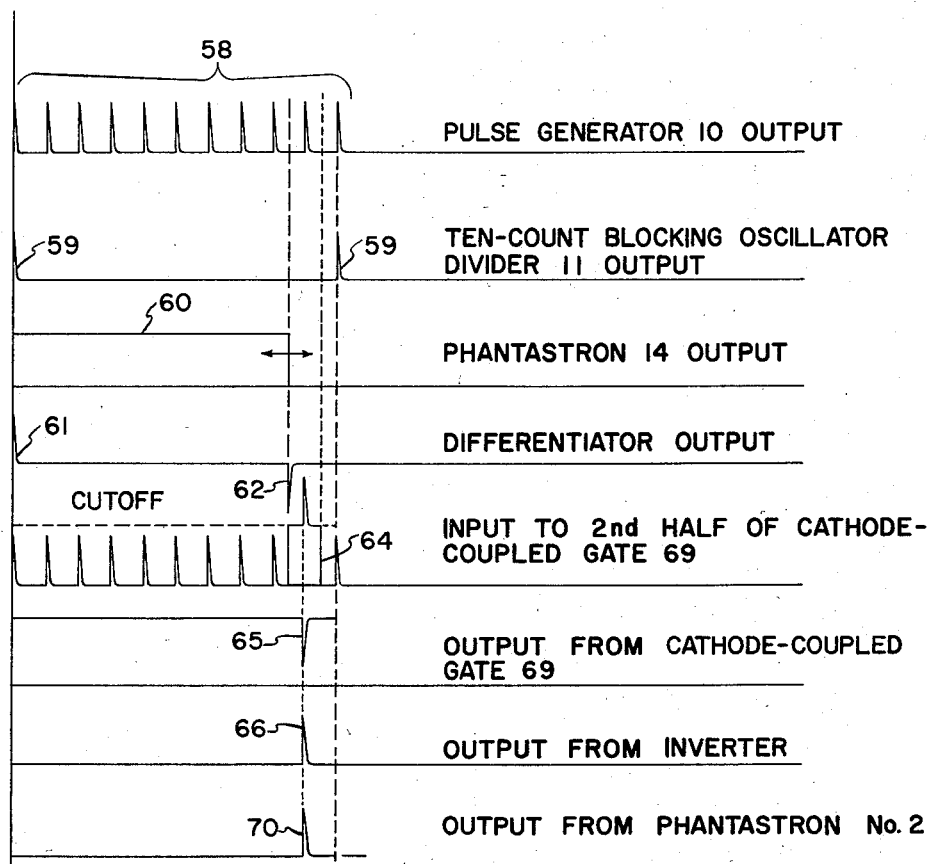
Figure 2 is a diagram of pertinent wave forms at selected points in the circuitry of Figure 1.

The circuit of Figure 1 operates as follows. For purposes of clarity Figures 1 and 2 shall be discussed simultaneously. Pulse generator 10 produces pulse train 58 (see Figure 2) of sharp, evenly spaced pulses. Blocking oscillator 11 is lightly synchronized by the output pulses of pulse generator 10 to serve as a divider circuit. Let it be assumed that it is desired to divide the antenna vertical scan into ten sectors of arc. Blocking oscillator 11 will then be designed as a ten-count divider, producing output pulses 59 (see Figure 2). A variety of methods are, of course, available to synchronize the "zero" elevation position of the vertical scanning antenna with the output pulse from divider 11. An explanation of the operation of phantastron 14 will be familiar. Pentode vacuum tube 15 in fact serves as two tubes or control elements, a first triode consisting of cathode 16, control electrode 18 and screen electrode 22, and a second triode consisting of cathode 16, suppressor electrode 26 and anode 20. In the absence of a positive input pulse on suppressor electrode 26, screen electrode 22 conducts heavily and increases cathode bias by reason of the large cathode current which causes the effective second triode (composed of cathode 16, control electrode 18 and anode 20) to be cut off. Hence, the anode voltage of vacuum tube 15 will be high (B+), screen grid potential will be low, and capacitor 21 will be charged. Upon the appearance of a positive input pulse upon suppressor electrode 26, effective triode number two will conduct, producing anode current, and capacitor 21 will discharge through resistor 19 and thus put a negative bias on effective triode number one. This effect decreases the bias on effective triode number two, allowing more anode current to flow and sustaining the discharge of capacitor 21 through resistor 19, the effect being cumulative, and hence effective triode number one will be cut off for a considerable period of time. When capacitor 21 has discharged through resistor 19, effective triode number one will begin to conduct, this tendency is also cumulative and the potential on screen electrode 22 will rapidly approach its normal value before the occurrence of the input pulse to suppressor electrode 26. The output pulse is taken from screen electrode 22 and appears as square wave 60 in Figure 2. The trailing edge of square wave 60 may be made variable by changing either the R–C time constant of resistor 19 and capacitor 21, or, more practicably, by changing the positive potential applied to suppressor electrode 26. As the positive potential on suppressor electrode 26 is increased, the pulse width of pulse 60 will be increased proportionately. Resistance ring 28 of potentiometer 27 may be so designed that with a particular placement of switch arm 29 the trailing edge of pulse 60 will fall, time-wise, just before a particular pulse of the pulse generator train occurs. The output square wave signal from phantastron 14 is tapped from output terminal 24 and passed to cathode-coupled gate circuit 69 (also termed a mono-stable multivibrator) by way of an R–C differentiator consisting of capacitor 32 and resistor 44. Best performance of the present invention will be aided by employing an R–C differentiator circuit with a very short time constant to provide a sharp positive peak and negative peak differentiator signal for application to control electrode 33 of vacuum tube 34. Since control electrode 33 is coupled through resistor 44 to source of positive voltage (B+), the positive pulses of the differentiator output signal (see pulse 61 in Figure 2) will have little, if any, effect upon the anode current of vacuum tube 34. Negative pulses, however, will have a decided effect upon the cathode-coupled gate circuit. The time occurrence of these negative pulses (see pulse 62 in Figure 2) will be determined by the positioning of the trailing edge of square wave pulse 60 coming from phantastron 14. In cathode-coupled gate circuit 35, vacuum tube 38 is cut off, in the absence of an input negative signal, by reason of a large negative voltage (C—) being applied to control electrode 45. Also, vacuum tube 34 is initially conducting. When negative pulse 62 (see Figure 2) appears at control electrode 33 of vacuum tube 34, this negative pulse will cut off vacuum tube 34. Thereupon, the anode voltage of vacuum tube 34 will rise and capacitor 47 will charge through resistor 41 so as to feed a positive pulse to control electrode 45 of vacuum tube 38. This pulse on the control electrode of vacuum tube 38 will increase the cathode bias, simultaneously, of vacuum tube 34 tending to maintain this tube at cut-off. Hence, the effect of maintaining vacuum tube 34 at cut-off and vacuum tube 38 in its conducting state is cumulative, a common characteristic of all multivibrators. When capacitor 47 has charged sufficiently, current through resistor 63 will decrease, thus decreasing the anode current of vacuum tube 38 and consequently decreasing the cathode bias on vacuum tube 34, permitting vacuum tube 34 to conduct. Conduction by vacuum tube 34 will cause capacitor 47 to discharge through resistor 63, which increases the negative bias on vacuum tube 38, causing it to approach rapidly its non-conducting state. This effect is likewise cumulative. Consequently, the wave form of control electrode 45 will appear as a positive pedestal, shown in Figure 2 as pedestal 64. The width of pedestal 64 will be determined by the R-C time constant of the circuit including resistor 41, capacitor 47, and resistor 63. The output pulse train signal from pulse generator 10 is also coupled to control electrode 45 of vacuum tube 38. Vacuum tube 38 is maintained below cut-off in the absence of a negative input signal so that the pulse train from generator 10 will not be reflected in the anode circuit of vacuum tube 38. When, however, a negative pulse appears at control electrode 33 of vacuum tube 34, a positive pedestal 64 will appear at control electrode 45 of vacuum tube 38. The particular pulse of pulse train 58 selected, by virtue of the positioning of arm 25 upon potentiometer 27, will ride atop pedestal 64, and will be reflected in the anode circuit of vacuum tube 38 as a sharp negative pulse, shown as pulse 65 in Figure 2. Negative pulse 65 is passed through inverter 49 and thereby becomes positive pulse 66, shown in Figure 2. Positive pulse 66 triggers phantastron 51 which produces an output square wave pulse the pulse width of which is dependent upon the R–C time constant of resistor 67 and capacitor 68. This time constant will be chosen in order to facilitate the display of the particular incremental arc of the vertical antenna scan in which the operator will be interested. The output waveform of phantastron 51 is shown in Figure 2 as pulse 70. Output pulse 70 from phantastron 51 is passed through an R–C differentiator circuit, consisting of resistor 57 and capacitor 54, which is chosen to have a long time constant—to preserve the essential square wave characteristic of the output wave form from phantastron 51. Cathode ray tube 56 will, of course, normally be biased beyond cut-off. With the appearance of positive pulse 70 from phantastron 51, cathode ray tube conduction will be achieved, during the time interval which corresponds to the output pulse width from phantastron 51. During the time interval of the remaining vertical antenna cycle, the CRT radar display device will be inoperative.

It is accordingly seen that this invention provides a new and useful circuit for providing a gating signal to be applied to the CRT display tube of a conventional radar scanning system.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A pulse train source, a blocking oscillator divider coupled to said source, a square wave signal producing time base generator coupled to said blocking oscillator divider and having adjustable means for controlling the trailing edge occurrence of said square wave signal from said generator, signal differentiating means coupled to said generator for producing a control pulse having a time of occurrence equivalent to the time-occurrence of said trailing edge of said square wave signal, a cathode-coupled gate circuit coupled to said differentiating means, said cathode-coupled gate circuit having first and second vacuum tubes with anode, cathode, and control electrodes, a resistance-capacitance charging circuit intercoupling said anode of said first vacuum tube with said control electrode of said second vacuum tube, said control electrodes of said first vacuum tube being coupled to said differentiating means, a source of below cut-off negative bias voltage coupled to said control electrode of said second vacuum tube, said pulse train source also being coupled to said control electrode of said second vacuum tube, and an output terminal coupled to said anode of said second vacuum tube.

2. In combination, first and second vacuum tubes each having anode, cathode, and control electrodes, a first resistor having a first end terminal coupled to said cathodes of said first and second vacuum tubes and a second end terminal maintained at a common reference potential, a source of negative pulses coupled to said control electrode of said first vacuum tube, a source of positive pulses coupled to said control electrode of said second vacuum tube, a second resistor having a first end terminal coupled to said control electrode of said second vacuum tube and a second end terminal maintained at a negative, below-cut-off potential, a third resistor having a first end terminal coupled to said anode of said first vacuum tube and a second end terminal maintained at a positive operating potential, a fourth resistor having a first end terminal coupled to said anode of said second vacuum tube and a second end terminal maintained at said positive operating potential, a first capacitor intercoupling said second and third resistors, and a second and output coupling capacitor coupled to said anode of said second vacuum tube.

References Cited in the file of this patent

UNITED STATES PATENTS

| | | |
|---|---|---|
| 2,258,370 | Taylor et al. | Oct. 7, 1941 |
| 2,261,776 | Poch | Nov. 4, 1941 |
| 2,447,799 | Dickinson | Aug. 24, 1948 |
| 2,500,788 | Bass | Mar. 14, 1950 |
| 2,515,464 | Minneman | July 18, 1950 |
| 2,577,536 | MacNichol | Dec. 4, 1951 |
| 2,586,605 | Blumlein | Feb. 19, 1952 |
| 2,645,713 | Pritchard | July 14, 1953 |
| 2,689,347 | Lawrance | Sept. 14, 1954 |
| 2,697,797 | Holmes | Dec. 21, 1954 |